United States Patent [19]

Meier et al.

[11] Patent Number: 5,322,480

[45] Date of Patent: Jun. 21, 1994

[54] DRAGCHAIN SUBSTITUTE

[76] Inventors: Karl Meier, Westendstr. 12, 8548 Heideck; Josef Steff, Hagenbuchring 19, 8831 Meinheim; Karl-Heinz Trieb, Lindenstr. 15, 8820 Gunzenhausen, all of Fed. Rep. of Germany

[21] Appl. No.: 805,685

[22] Filed: Dec. 10, 1991

[30] Foreign Application Priority Data

Nov. 26, 1991 [EP] European Pat. Off. ........ 91120167.1

[51] Int. Cl.⁵ .................... F16H 57/02; H02G 11/00
[52] U.S. Cl. ................................... 474/145; 474/147; 474/273; 174/99 E; 174/97; 191/12.2 A; 254/134.3 FT
[58] Field of Search ............... 474/145-147, 474/237; 191/12.2 A, 12 R; 254/134.3 FT; 174/97, 117 F; 29/33 K, 33 M, 749, 759, 854, 861; 439/70, 259, 260, 264, 499

[56] References Cited

U.S. PATENT DOCUMENTS

| 686,052 | 11/1901 | Golding | 174/97 |
| 3,473,769 | 10/1969 | James | 191/12 R |
| 3,752,180 | 8/1973 | Elder | 191/12 R X |
| 5,149,017 | 9/1992 | McEntire et al. | 191/12 R X |

FOREIGN PATENT DOCUMENTS

| 712656 | 6/1965 | Canada | 174/117 F |
| 18193 | 10/1980 | European Pat. Off. | 191/12 R |
| 436373 | 11/1925 | Fed. Rep. of Germany | 191/12.2 A |
| 3300495 | 7/1983 | Fed. Rep. of Germany | 191/12 R |
| 1288769 | 2/1987 | U.S.S.R. | 191/12 R |
| 1534596 | 1/1990 | U.S.S.R. | 191/12 R |

Primary Examiner—Terry Lee Melius
Assistant Examiner—Roger J. Schoeppel

[57] ABSTRACT

A dragchain substitute in the form of a line guiding assembly comprising at least one line receiving channel for receiving at least one line loosely disposed therein. At least one of the channel walls of each line receiving channel is designed in projecting manner and resilient towards the channel interior relative to a channel wall supporting it, such that the line can be urged from outside of the line receiving channel through the resilient channel wall and into the interior of the line receiving channel and is enclosed in the line receiving channel after said resilient channel wall has resiled.

17 Claims, 6 Drawing Sheets

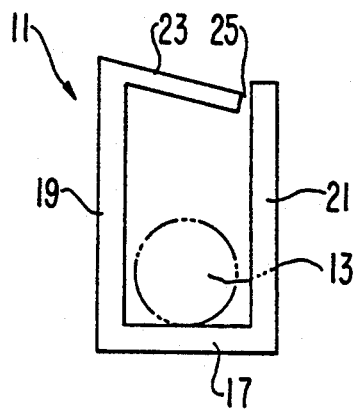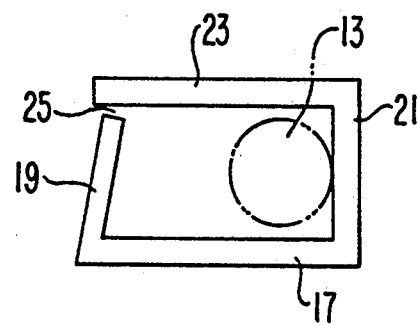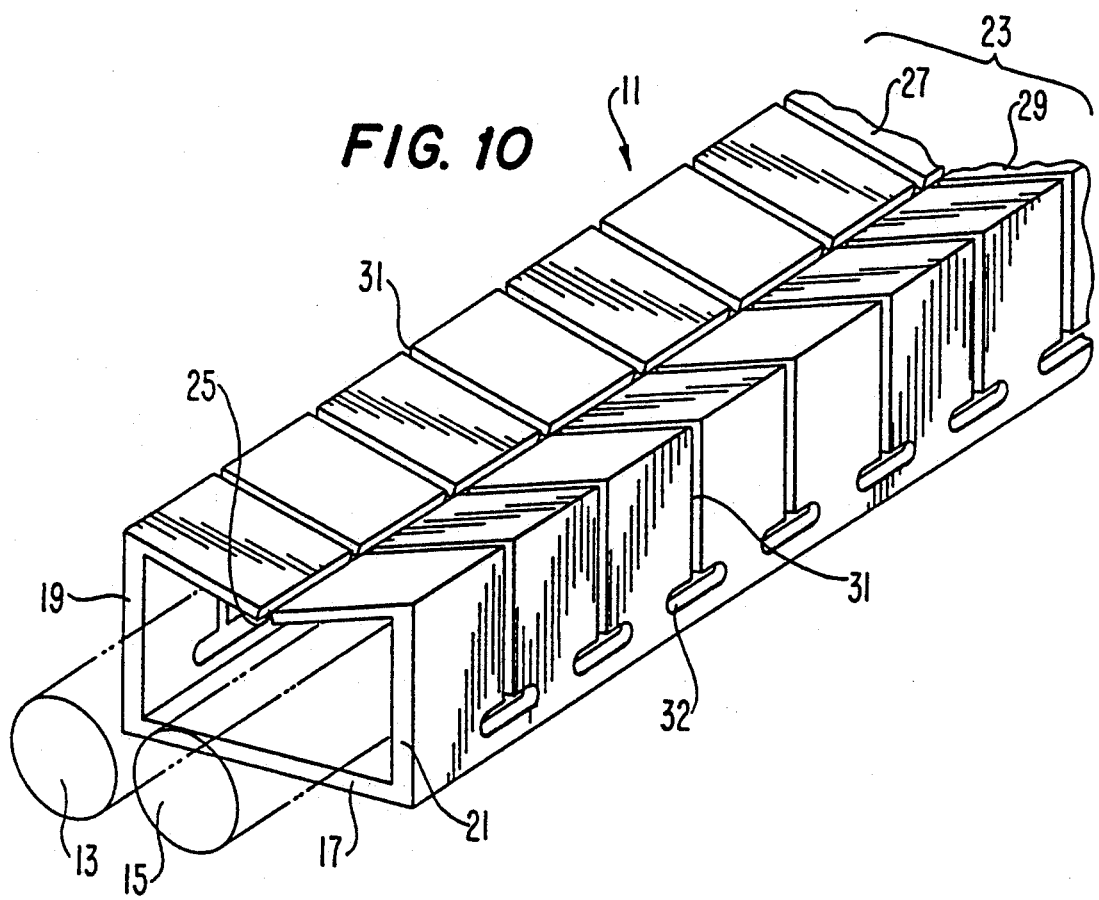

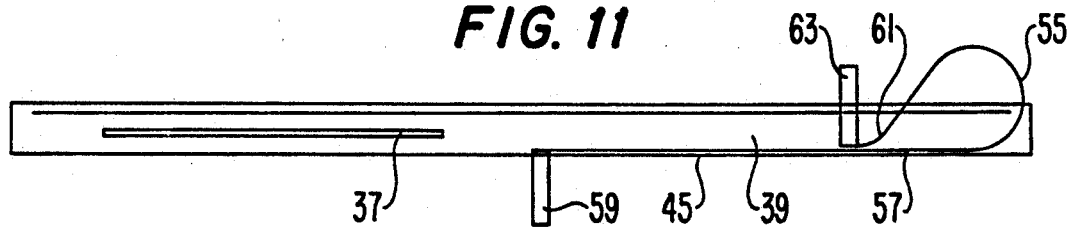
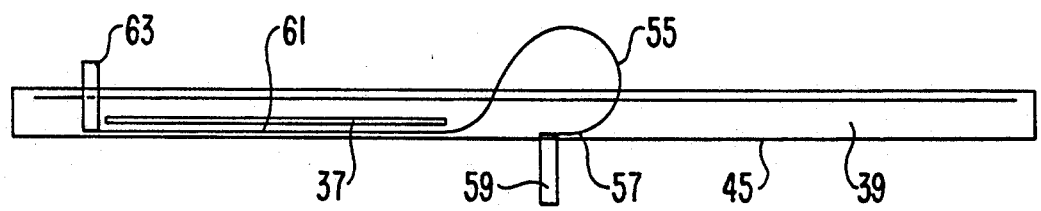
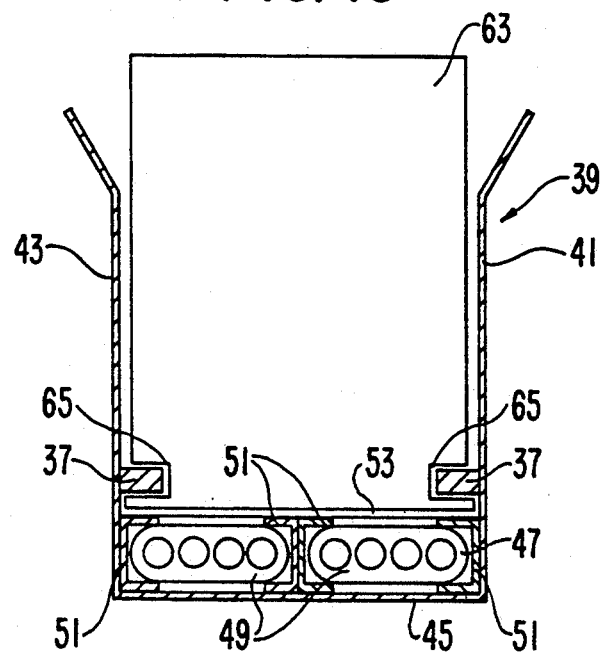

DRAGCHAIN SUBSTITUTE

FIELD OF THE INVENTION

A dragchain substitute in the form of a line guiding assembly comprising at least one line receiving channel for receiving at least one line loosely disposed therein is provided.

BACKGROUND OF THE INVENTION

Many problems exist with conventional dragchain assemblies having one or more chain belts of metal or plastics material in which individual lines are guided. Many of these problems are described in European Patent Application 91105430.2. When the stationary means and the reciprocable means are arranged in a superimposed manner and when the dragchain exceeds a certain length with respect to the necessary path of movement of the movable means, the upper length of the dragchain is deposited on the lower length thereof. This results in a high mechanical load on the dragchain, which can be prevented by way of an intermediate ceiling in the form of a slide plate in a guiding channel for the dragchain, with the upper length of the dragchain being deposited on the slide plate. An additional problem is that the dragchain may cause considerable movement noise.

The solution described in EP91105430.2 for overcoming this problem consists in providing the line or line assembly to be guided, on the side where upper length and lower length are facing each other, with a sliding means of good slidability which is effective in the longitudinal direction of the line and prevents friction between upper length and lower length also in case of long line lengths. One of the solution possibilities described in EP91105430.2 consists in a line receiving channel in which one or more lines to be guided are loosely disposed and which consists of a material having good slidability. Various possibilities for such a line receiving channel are shown in the figures of EP91105430.2.

FIG. 16 shows a solution described in EP91105430.2 which consists of a line receiving channel for a ribbon cable having associated therewith a sliding means in the form of a sliding band disposed on one side of the ribbon cable and projecting on both sides beyond the longitudinal edges of the cable jacket. From each of the two portions projecting beyond the ribbon cable, a multiplicity of holding pins spaced apart in the longitudinal direction of the ribbon cable upstands beyond the cable thickness, with the free ends of the holding pins being bent onto the face of the cable jacket remote from the sliding band. With this type of line receiving channel it is either necessary to introduce the ribbon cable from one end of the line receiving channel underneath the bent holding pins. Alternatively, the holding pins can be mounted only after placement of the ribbon cable on the sliding band. A third possibility consists of mounting to the sliding band holding pins which are first upstanding in straight manner and to bend these holding pins in angular manner across the ribbon cable only after placement of the ribbon cable on the sliding band.

FIG. 17 also described in EP91105430.2 shows a line receiving channel that is closed all around, along with the transverse slots thereof allowing loop formation, with the line or lines to be guided having to be introduced into the channel from one channel end.

FIG. 18 also described in EP91105430.2 shows a line receiving channel that is first open on an upper side so that the line or lines can be inserted conveniently in the line receiving channel. Thereafter, the line receiving channel is closed by means of a multiplicity of spaced apart closure clasps which each bridge the open channel and are attached thereto for instance by glueing or welding.

The solutions mentioned either necessitate a specific assembly expenditure for closing an initially open line receiving channel after loose insertion of one or more lines, or they require line introduction from an end of the line channel, which may be troublesome especially in case of line guiding assemblies of considerable length and/or lines of low stiffness of their own.

There is a need to provide a line guiding assembly of the type serving as a dragchain substitute and having at least one line receiving channel, in which the introduction of the one or more lines in the line receiving channel is facilitated.

SUMMARY OF THE INVENTION

The invention relates to a dragchain substitute in the form of a line guiding assembly comprising at least one line receiving channel having a floor portion, a cover or top portion and sidewall portions, and at least one single-core or multi-core line loosely disposed therein. The line receiving channel comprises a first length and a second length guided parallel thereto, the length ends being connected to a stationary means and to a means adapted to reciprocate in the longitudinal direction of the line receiving channel, respectively, and the two lengths merging with each other in loop-shaped manner therebetween. The floor portion of at least one line receiving channel, with which the first and second length are facing each other, is made of a material with good slidability for sliding on each other. At least one line of the receiving channel is provided with a multiplicity of transverse separations spaced from each other in the longitudinal direction of the channel and extend through the cover portion and continue in the sidewall portions at least to a location near the floor portion. These transverse separations permit at least one line receiving channel the loop formation between first and second length.

With this line guiding assembly, that includes a cover portion and sidewall portions of the line receiving channel, at least one of these portions is designed in a projecting manner and is resilient towards the channel interior relative to a channel wall portion supporting the portion, such that the line can be urged from outside of the line receiving channel into the interior of the line receiving channel through the resilient portion and is enclosed in the line receiving channel.

The term projecting as used herein is understood to be the result when the cover or side portion is fixed only at one end and freely projects.

The invention provides modifications to the line receiving channel shown in FIG. 16. The present invention provides that all of the holding pins or at least the holding pin portions extending beyond the upper longitudinal side of the ribbon cable are resilient. The height of the holding pins and the length of their ends projecting beyond the ribbon cable are chosen such that the ribbon cable can be urged past the resilient holding pins onto the sliding band and that the holding pins can return to their normal positions after this urging operation.

When starting from the line receiving channel as shown in 10 FIG. 17 the present invention provides that a wall of the rectangular line receiving channel, for instance the cover wall or a sidewall, is given a longitudinal separation in such a manner that the cover or sidewall has at least one resilient or spring portion projecting from another channel wall. The longitudinal separation may extend in the middle of the cover or sidewall, respectively, or at the transition thereof to one of the two adjacent channel walls. In the first-mentioned case, the cover or sidewall has two facing spring portions projecting towards each other and each extending across part of the channel width only. In the latter case, the cover or sidewall has a projecting spring portion extending across the entire channel width. In the latter case both channel walls adjoining the longitudinal separation can be made resilient so that the line or lines can be urged into the line receiving channel selectively either from the one or the other channel wall of the two channel walls adjacent the longitudinal separation, or also with resilient deflection of these two channel walls adjacent the longitudinal separation.

For facilitating the line or lines into the line receiving channel, the channel wall formed with the longitudinal separation can be inclined with its projecting end or ends towards the interior of the line receiving channel so as to form an aid for line insertion.

When the line guiding assembly is intended to guide a plurality of lines or cables, it is either possible to use one single line receiving channel adapted to receive all lines or cables, or it is possible to form the line guiding assembly with a plurality of parallel juxtaposed line receiving channels which are either formed beside each other in an integrally formed or extruded line receiving channel assembly or which are combined to form a line receiving channel unit by fixedly or removably connecting several individual line receiving channels. Each of these line receiving channels then has a channel wall with a projecting resilient or spring portion.

In this line guiding assembly, the longitudinal separation is preferably formed in the cover portion of the line receiving channel, such that the channel wall is located on the outside in the loop-shaped transition portion between the upper length and the lower length. Transverse separations for enabling the line receiving channel to bend in loop-shaped manner are arranged in the cover portion and extend into the adjacent sidewalls up to the channel floor opposite the cover portion.

The transverse separations are preferably formed by transverse grooves having groove bottoms widening with respect to the remaining groove width, for instance in the form of an inverse T.

In case of relatively long movement distances of horizontally reciprocable movable means, correspondingly long upper length dimensions result when the movable means is in that end position which leads to the shortest lower length dimension. In case of a rapid movement of the movable means in the direction towards the loop portion formed between upper length and lower length, in particular along with a high acceleration of the movable means, the thrust force acting on the upper length can easily lead to distortions of the upper length, causing the formation of bulges or even breaks. This leads to a strong mechanical load of the dragchain substitute and of the line assembly guided thereby.

The present invention eliminates this problem in that a hold-down means is disposed in a line guiding channel which holds down the upper length in the region between the stationary line assembly end and that end position of the movable line assembly end in which the lower length is shortest, and keeps the upper length to the floor of the line guiding channel.

The hold-down means is preferably constituted by two hold-down rails which extend in the longitudinal direction of the line guiding channel approximately across the portion between the stationary line assembly end and that end position of the movable line assembly end in which the lower length is shortest, and which each project towards each other from one of the two opposing sidewall interiors of the line guiding channel and extend at a clear distance from the floor of the line guiding channel which is somewhat larger than the thickness of the line assembly.

The features of the hold-down means have significance of their own and yield advantages irrespective of whether or not the dragchain substitute has a line receiving channel.

It is particularly advantageous to use the hold-down means with a dragchain substitute having disposed in its loop-portion a roller which is movable together with the loop portion and on which the dragchain substitute performs a rolling motion upon movement of the line assembly. The roller preferably has a diameter that is greater than the loop diameter of the line assembly without such roller. In particularly preferred manner, the roller is loosely disposed in the loop portion. The roller circumference should have such friction with respect to the line assembly or the line receiving channel, respectively, that the line assembly or the line receiving channel is not lifted off from the roller circumference in case of a thrust force acting on the upper length. The roller circumference therefore is composed with a material such as rubber or relatively soft plastic material which, in cooperation with the material of the line assembly or the line receiving channel, results in such frictional force that such lifting-off of the line assembly or of the line receiving channel from the roller circumference is avoided.

The roller prevents lasting bulge-like deformations of the line assembly or of the line receiving channel, respectively, due to a prolonged standstill of the movable means. The roller can also be used for predetermining the desired loop diameter. Furthermore, the roller has the effect of a dampening member which dampens oscillations occurring in the upper length portion during rapid reciprocating movements of the movable means.

BRIEF DESCRIPTION OF THE DRAWINGS

FIG. 8 is a view of an embodiment of a line receiving channel having a longitudinal separation provided between a lateral end of the cover portion and the adjacent sidewall.

FIG. 9 is a view of an embodiment having a longitudinal separation provided at the upper end of a sidewall.

FIG. 10 is a view of an embodiment as shown in FIGS. 1 and 2, however with modified transverse separations.

FIGS. 11 and 12 are schematic side views of a dragchain substitute having a hold-down means, with FIGS. 11 and 12 showing opposite end positions of the movable means.

FIG. 13 is a cross-sectional view of a dragchain substitute having a hold-down means according to FIGS. 11 and 12.

DETAILED DESCRIPTION OF THE INVENTION

The invention is best understood with reference to the accompanying figures.

Figure 1:
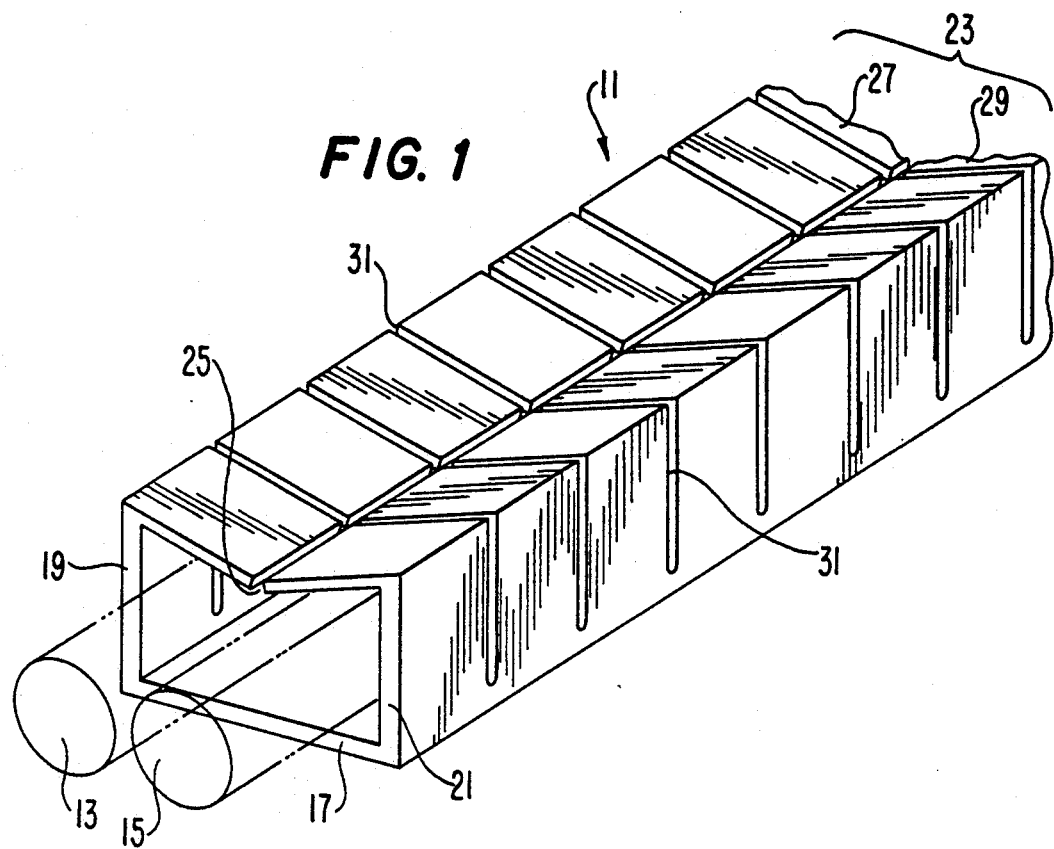
FIG. 1 is a perspective view of a line guiding assembly according to the invention, illustrating one single line receiving channel in perspective manner.

FIG. 1 shows in a perspective view a first embodiment of a line guiding assembly in the form of a line receiving channel 11 which may be adapted to receive, for example, two juxtaposed round lines 13 and 15 indicated in FIG. 1 by dot and dash lines. The line receiving channel 11 comprises a floor 17, a left-hand sidewall 19, a right-hand sidewall 21 and a cover or top 23. Cover 23 is split by a longitudinal separation 25 extending in the center thereof in longitudinal direction of the channel, such that a lefthand cover portion 27 and a right-hand cover portion 29 are formed. Each of the two cover portions 27 and 29 is slightly inclined towards the channel interior from its longitudinal lateral edge towards longitudinal separation 25. This results in a kind of insertion aid facilitating urging of a line into the interior of the line receiving channel 11.

The line receiving channel 11 is provided with transverse separations 31 which are arranged in periodically successive manner in the longitudinal direction thereof and which extend through both cover portions 27 and 29 and into the respective adjacent sidewall 19 and 21, respectively, preferably up to the transition of the respective sidewall 19 and 21, respectively, to the floor 17.

The line receiving channel 11 consists of an elastic, resilient material. Due to this resilience, the cover portions 27 and 29 can be resiliently deflected towards the channel interior when a line or a cable is to be urged into line receiving channel 11. This resilience is enhanced by the presence of the transverse separations 31.

When the line guiding assembly, between a stationary means and a means adapted to reciprocate relative to the latter, is of such a length that the particular upper length is deposited on the lower length, the line receiving channel 11 is made of a material having good sliding properties, so that upper length and lower length have good slidability for sliding on each other with their floor portions. The loop formation at the transition between upper length and lower length is rendered possible by the transverse separations 31.

However, it is also possible to produce only the floor 17 of material with good slidability, or to apply a material with good slidability to the floor 17.

The line receiving channel preferably is made of an elastic plastic material with good slidability, such as polypropylene. Other plastic materials or metals, for instance steel, may be used as well.

The height of the sidewalls 19 and 21, the inclination of the two cover portions 27 and 29 as well as the width of the longitudinal separation 25 are selected such that the free ends of the cover portions 27 and 29 can resume their original positions when the cables or lines 13 and 15 have been urged through the longitudinally split cover 23 onto the floor 17 of the line receiving channel 11. In FIG. 1, the thickness of the lines are thinner or flatter than the dimensions of the line receiving channel shown.

Figure 2:
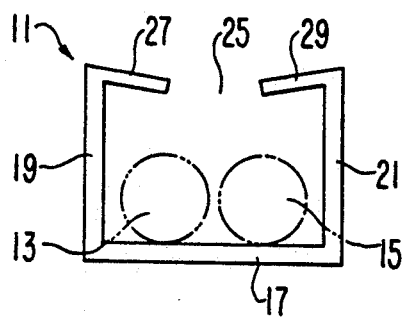
FIG. 2 is a face end view of the line guiding assembly shown in FIG. 1.

FIG. 2 shows in an end view the embodiment of a line receiving channel 11 depicted in FIG. 1 together with the round lines 13 and 15 accommodated therein.

Figure 3:
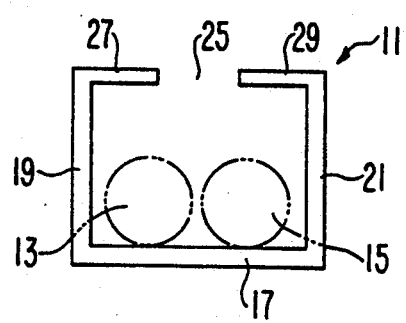
FIG. 3 is an end view of a line guiding assembly that is modified with respect to FIG. 1.

A similar view is shown in FIG. 3, however, relating to an embodiment of a line receiving channel 11 in which the separated cover portions 27 and 29 are not inclined, but extend parallel to the floor 17.

Figure 4:
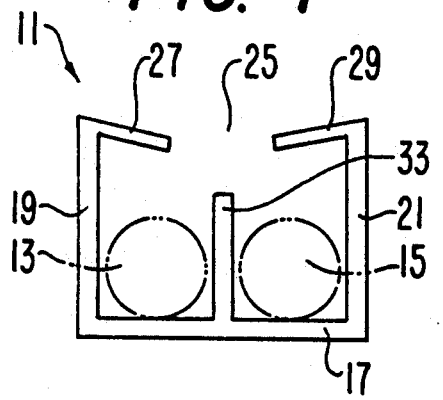
FIG. 4 is an end view of the embodiment shown in FIGS. 1 and 2, however having a partition inside the line receiving channel.
Figure 5:
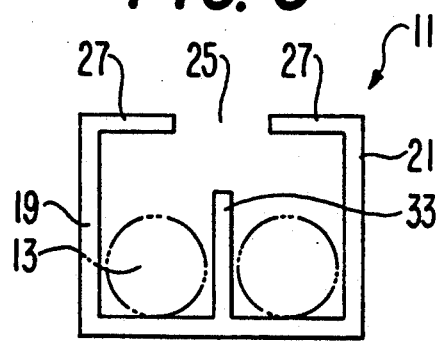
FIG. 5 is an end view of an embodiment according to FIG. 3, however, having a partition in the line receiving channel.

The embodiments shown in FIGS. 1 to 3 have two round lines 13 and 15 that are arranged beside each other without separation. Alternatively, FIGS. 4 and 5 show the round lines separated by a line separating wall 33 in the middle of the line receiving channel 11.

The transverse separations 31 extend also through the line separating walls 33 in order to enable loop formation of the respective line receiving channel 11 without any problem.

Figure 6:
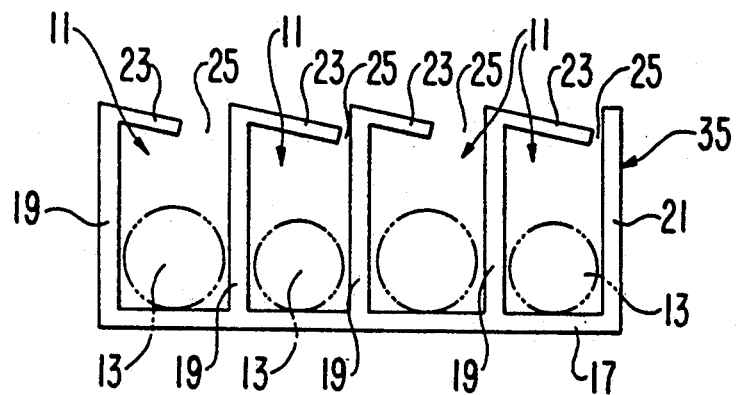
FIG. 6 is an end view of a line guiding assembly comprising four line receiving channels.
Figure 7:
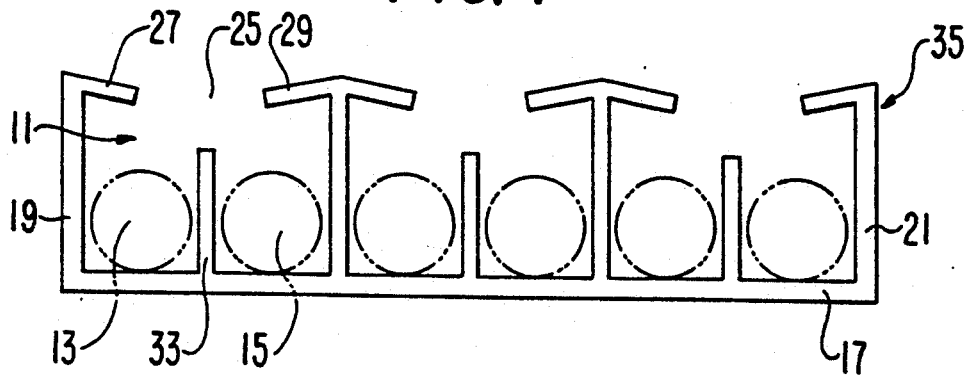
FIG. 7 is an end view of a line guiding assembly having three line receiving channels, each provided with a partition.

FIGS. 6 and 7 illustrate end views of embodiments in which the line guiding assembly according to the invention each comprises a plurality of parallel juxtaposed line receiving channels.

FIG. 6 shows an integrally formed line guiding assembly 35 that has four parallel line receiving channels 11 disposed therein, each having a round line 13 arranged therein. The longitudinal separation 25 of each one of these line receiving channels 11 extends at the transition between the associated cover 23 and the right-hand sidewall of each line receiving channel 11. The cover 23 of each line receiving channel 11 is obliquely inclined downwardly so as to facilitate urging of a line into the respective line receiving channel 11. The transverse separations 31 extend through all channel sidewalls in order to enable loop formation.

FIG. 7 shows a line guiding assembly 35 having three parallel line receiving channels 11 each suited to receive two round lines 13 and 15 and provided with central line separating walls 33. The covers 23 of the individual line receiving channels 11 are each provided in their center with a longitudinal separation 25, and the thus created left-hand and right-hand cover portions 27, 29 are each inclined obliquely downwardly towards the associated line separating wall 33.

In this embodiment the transverse separations 31 extend through all channel sidewalls and through all line separating walls 33 so as to enable bending in the region of the loop transition between upper length and lower length without any problem.

In the illustrated examples, round lines 13, 15 are inserted in the line receiving channels 11. Of course, it is also possible to insert ribbon cables, for instance in the line receiving channels 11 shown in FIGS. 2 and 3.

FIG. 8 illustrates an end view of a line receiving channel 11 in which the entire cover portion 23 is designed in projecting manner. In this embodiment, a longitudinal separation 25 is formed between the free end of the cover portion 23 and the adjacent sidewall 21.

FIG. 9 shows an end view of an embodiment in which a sidewall 19 is designed in projecting manner, with a longitudinal separation 25 being formed between the upper end of this sidewall 19 and the cover portion 23. In this embodiment the sidewall 19 is resilient towards the channel interior. A round line 13 can thus be urged into the channel interior by resiliently urging sidewall 19 inwardly.

FIG. 10 shows a modification of the embodiment illustrated in FIG. 1. The difference between FIG. 1 and FIG. 10 is that the transverse separations 31 are constituted by transverse grooves whose groove bottoms 32 are widened in the form of an inverted T. This widening of the groove bottom improves the flexural mobility of the line receiving channel 11 and eliminates the risk that uncontrolled tearing occurs at the lower groove ends.

FIGS. 11 to 13 depict in schematic manner an embodiment of a dragchain substitute having hold-down rails. The cross-sectional view of FIG. 13 shows an upwardly open line guiding channel 39 having sidewalls 41 and 43. On a channel floor 45, there is located a line assembly 47 including two juxtaposed ribbon cables each disposed between two laterally opposite sliding channels 51, the four sliding channels along with the ribbon cables 49 being combined to form the line assembly 47 by means of transverse lugs 53 spaced apart in the longitudinal direction of the line assembly 47. At a slight distance above the transverse lugs 53, there are located the two hold-down rails 37 projecting each from the inside of one of the two sidewalls 41 and 43 into the interior of the line guiding channel 39.

As outlined in FIGS. 11 and 12, the end of the lower length 57 remote from the loop portion 55 is connected to the upper end of a stationary foot plate 59. The free end of the upper length 61 remote from the loop portion 55 is connected to an upstanding movable head plate 63 serving as a spacer member. The foot plate 59 is connected to a stationary means. The head plate 63 is connected to a reciprocable means.

Upon movement of the movable means between its two end positions, the head plate 63 moves between two end portions which are shown in FIGS. 11 and 12. The hold-down rails 37 are disposed between the position of the stationary foot plate 59 and the left-hand end position of the head plate 63 as shown in FIG. 12, with the lower length 57 being shortest in this position. The hold-down rails 37 are restricted to this portion of the path of movement of the movable head plate 63, in order not to collide on the one hand with the loop portion 55 of the line assembly 47 and since on the other hand distortions and bulges due to rapid movement of the head plate 63 without the provision of the hold-down rails 37 occur only when a particularly long upper length 61 is pushed by the head plate 63.

For rendering possible that the head plate 63 projecting from above into the line guiding channel 39 can be moved in the line guiding channel 39 without being hindered by the hold-down rails 37, the head plate 63 in the embodiment shown in FIG. 13 is provided on both sides with one recess 65 each, into which one of the two hold-down rails 37 can project such that movement can take place in unhindered manner.

It would also be possible to reduce the width of the head plate to such an extent that it is smaller than the clear distance between the two facing hold-down rails 37.

Figure 14:
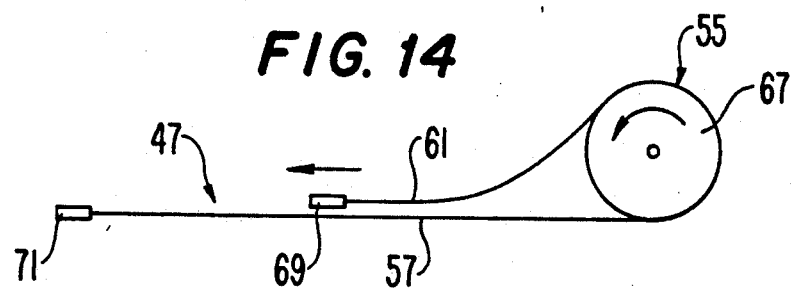
FIGS. 14 and 15 are schematic side views of a dragchain substitute having a roller disposed in the loop portion.
Figure 15:
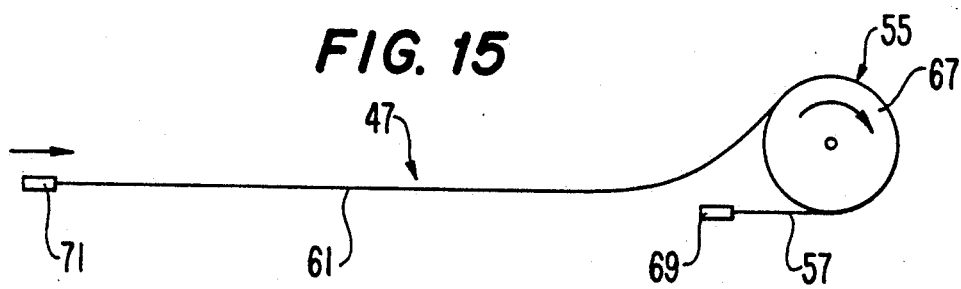
Figure 16:
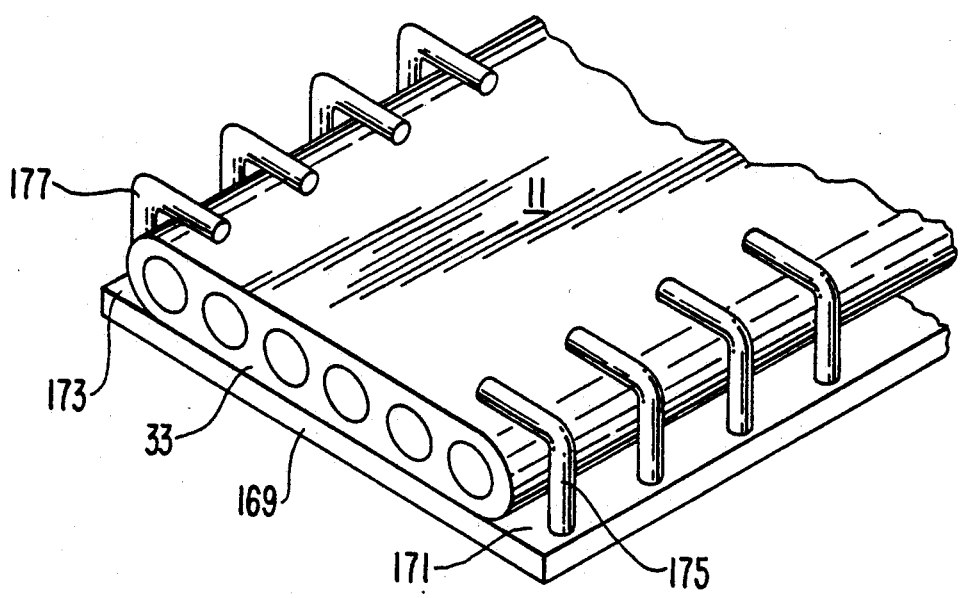
FIG. 16 is a view of a line receiving channel for a ribbon cable with sliding means in the form of a sliding band.
Figure 17:
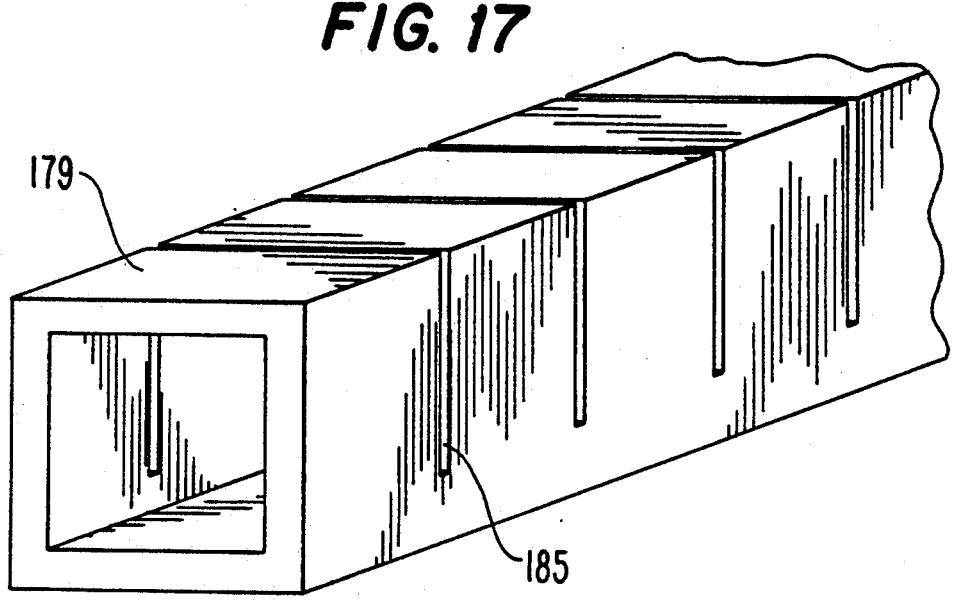
FIG. 17 is a view of a line receiving channel that is closed all around along with transverse slots.
Figure 18:
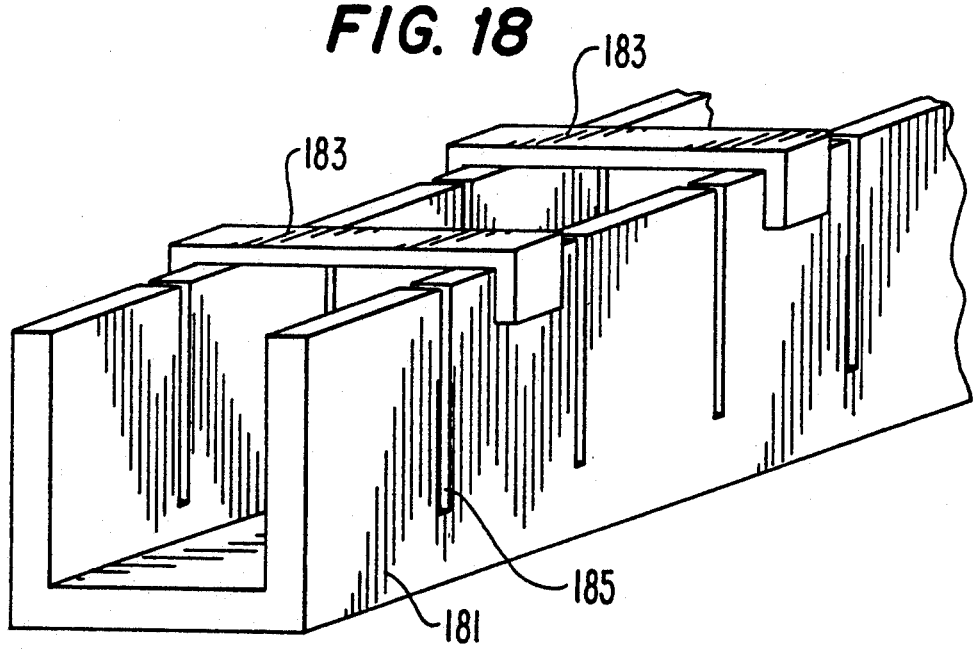
FIG. 18 is a view of a line receiving channel that is first open on an upperside and closed by plurality of clasp means.

FIGS. 14 and 15 illustrate a schematic side view of a dragchain substitute having a roller 67 loosely disposed in its loop portion. The loop portion 55 of the line assembly 47 performs a rolling motion on the circumference of the roller 67 when a movable means 69 is moved with respect to a stationary means 71 in horizontally reciprocating manner. During such movement, displacement of the loop portion 55 takes place, with the roller 67 following the loop portion.

The term "roller" is to be understood very broadly in the present case. It is to cover roller-like structures, either solid or hollow, spherical structures and polygonal structures.

We claim:

1. A dragchain substitute in the form of a line guiding assembly comprising at least one line receiving channel having a floor portion, a cover portion, and side-wall portions, and at least one single-core or multi-core line loosely disposed therein, the line receiving channel comprising a first length and a second length being parallel and merging in a loop-shaped manner and in contact with each other, and further being composed of material with good slidability for sliding on each other, the length ends being connected to a stationary means and to a means adapted to reciprocate in the longitudinal direction of the line receiving channel, respectively, the floor portion of the line receiving channel, the sidewall portions and the cover portion of the line receiving channel being provided with a multiplicity of transverse separations spaced from each other along the length of the channel characterized in that, of the cover portion and the sidewall portions of each line receiving channel, at least one of these portions is designed in a projecting manner and is resilient towards the channel interior relative to a channel wall portion supporting said portion, such that the line can be urged from outside of the line receiving channel into the interior of the line receiving channel through a resilient portion and is enclosed in the line receiving channel.

2. A dragchain substitute according to claim 1, wherein the line receiving channel is substantially of rectangular cross-section and comprises two sidewalls and a cover, and wherein the cover has a longitudinal separation in such a manner that it has at least one spring portion projecting from one of the sidewalls.

3. A dragchain substitute according to claim 2, wherein the longitudinal separation extends approximately in the middle of the cover such that two resilient cover portions are formed, each projecting from one of the two sidewalls and extending towards each other.

4. A dragchain substitute according to claim 2, wherein the longitudinal separation extends at the transition between the cover and a first one of the two sidewalls, and the cover projects from the other, second sidewall and extends towards the first sidewall, 5. A dragchain substitute according to claim 4, wherein the first sidewall is resilient towards the channel interior.

6. A dragchain substitute according to claim 2, wherein the cover and the first sidewall are subdivided by the transverse separations into individual resilient lugs.

7. A dragchain substitute according to claim 1, wherein the transverse separations comprise transverse grooves having widened groove bottoms.

8. A dragchain substitute according to claim 7, wherein the groove bottoms widen in a T-shaped manner.

9. A dragchain substitute according to claim 1, wherein the line receiving channel is formed with a channel floor and with angular members upstanding from both longitudinal sides thereof and spaced apart in a substantially periodic manner in the longitudinal direction of the channel and having a sidewall and cover function of the line receiving channel, such that the angular members each have a sidewall portion and a cover portion which partly extends across a line disposed in the line receiving channel, and in that at least the cover portions of the angular members are resilient towards the channel floor, such that the line can be urged from outside of the line receiving channel through the resilient cover portions of the angular members and into the interior of the line receiving channel and is enclosed in the line receiving channel after residing of the resilient cover portions.

10. A dragchain substitute according to claim 1, wherein the formation of a line insertion aid requires that the projecting resilient portion has its free end inclined towards the interior of the line receiving channel.

11. A dragchain substitute in the form of a line guiding assembly comprising a line guiding channel and a line assembly guided therein and including at least one single-core, line having a lower length and an upper length guided parallel thereabove, the length ends being connected to a stationary means and to a reciprocable means, respectively, and merging therebetween with a loop portion, at least that portion of the line assembly with which said two lengths are facing each other being composed with a material having good slidability for sliding on each other, in particular according to claim 1, wherein a hold-down means is disposed in the line guiding channel which holds down the upper length in the region between the stationary line assembly end and that end position of the movable line assembly end in which the lower length is shortest, and keeps it to the channel floor of the line guiding channel.

12. A dragchain substitute according to claim 11, wherein the hold-down means is constituted by two hold-down rails which extend longitudinally of the line guiding channel approximately across the portion between the stationary line assembly end and that end position of the movable line assembly end in which the lower length is shortest, which each project towards each other from one of the two opposing sidewalls of the line guiding channel and which extend at a clear distance from the channel floor which is somewhat larger than the horizontal thickness of the line assembly.

13. A dragchain substitute according to claim 12, in which the upper length end is connected to the movable means moving above the line guiding channel via a spacer projecting into the line guiding channel, such that a clear distance is present between the two hold-down rails that the spacer is adapted to pass between the two hold-down rails.

14. A dragchain substitute according to claim 1, wherein the loop portion of the line assembly is passed around a roller which is movable together with the loop portion and on which the line assembly performs a rolling motion upon movement of the movable means.

15. A dragchain substitute according to claim 14, wherein the roller has a diameter which is greater than the loop diameter of the loop portion when no roller is present.

16. A dragchain substitute according to claim 14, wherein the roller is loosely disposed in the loop portion.

17. A dragchain substitute according to claim 14, wherein the roller circumference is comprised of a material from the group consisting of rubber and soft plastic material effecting a high frictional force in cooperation with the material of the line assembly having good slidability for sliding on each other.

* * * * *